United States Patent [19]

Martin et al.

[11] Patent Number: 5,538,266
[45] Date of Patent: Jul. 23, 1996

[54] SUSPENSION MEANS FOR A UTILITY VEHICLE

[75] Inventors: Jean-Paul M. L. Martin, Le Fenouiller; Louis J.-B. Pambrun, La Roche sur Yon, both of France

[73] Assignee: New Holland North America, Inc., New Holland, Pa.

[21] Appl. No.: 502,724

[22] Filed: Jul. 14, 1995

[30] Foreign Application Priority Data

Jul. 5, 1994 [GB] United Kingdom ............... 9414296

[51] Int. Cl.⁶ ........................................................ B60S 9/00
[52] U.S. Cl. ...................... 280/6.12; 280/6.1; 280/6.11; 180/41
[58] Field of Search ................. 280/840, 6.1, 6.11, 280/612, 703, 772, 714; 180/41

[56] References Cited

U.S. PATENT DOCUMENTS

| | | | |
|---|---|---|---|
| 3,233,909 | 2/1966 | Boone | 280/6.12 |
| 4,247,126 | 1/1981 | Claxton | 280/6 H |
| 4,512,589 | 4/1985 | Ambrose et al. | 280/6 R |
| 4,568,095 | 2/1986 | Bogner et al. | 180/41 X |
| 4,580,797 | 4/1986 | Ericsson | 180/41 X |
| 4,991,673 | 2/1991 | Ericsson | 180/41 X |
| 5,176,391 | 1/1993 | Schneider et al. | 280/6.12 X |
| 5,261,691 | 11/1993 | Laichinger et al. | 280/714 |
| 5,342,080 | 8/1994 | Machida | 280/6.12 X |
| 5,415,586 | 5/1995 | Hanson et al. | 280/6.12 X |

FOREIGN PATENT DOCUMENTS

| | | |
|---|---|---|
| 1486255 | 9/1977 | United Kingdom . |
| 2040839 | 9/1980 | United Kingdom . |
| 2217272 | 10/1989 | United Kingdom . |

*Primary Examiner*—Christopher P. Ellis
*Attorney, Agent, or Firm*—Frank A. Seemar; Larry W. Miller

[57] ABSTRACT

A utility vehicle, such as a grape harvester (1) comprising a straddling frame (2), supported at its front and rear ends by double-acting hydraulic cylinders (17, 18 and 23, 24), which can be extended or retracted in order to level the frame (2). The rear cylinders (23, 24) are normally blocked for providing the vehicle (1) with a fixed rear axle (55), while the front cylinders (16, 17) are hydraulically interconnected in order to let them extend or retract in opposition to each other for providing the vehicle (1) with an articulated axle (56). The hydraulic cylinders (17, 18, 23, 24) are governed by two control valves (38, 39) which enable lifting, lowering and sideways levelling of the frame (2). During levelling operations, the hydraulic connection between the front cylinders (16, 17) is automatically broken by a control valve (65) in order to enhance the stability of the vehicle (1). This is particularly advantageous when the vehicle (1) is levelled during downhill travel.

5 Claims, 5 Drawing Sheets

SUSPENSION MEANS FOR A UTILITY VEHICLE

FIELD OF THE INVENTION

This invention relates generally to utility vehicles, such as grape or berry harvesters, vineyard tractors or other harvesting machines, which have been developed for use on sloping grounds, and more particularly to a hydraulic suspension means for controlling the vertical position of the vehicle when travelling across a slope.

BACKGROUND OF THE INVENTION

For utility vehicles which work on sloping grounds, it may be required to reposition their frame with respect to the ground. This can be generally required for stability reasons, but it is particularly important for agricultural vehicles, which are driven on slopes during the treatment of vertically growing plants. In order to obtain a good effect on the plants, it is necessary to keep the frame of the travelling harvesting vehicle in a fixed position relative the vertically growing plants, irrespective of the slope they are growing on.

Conventional grape harvesters, for example, comprise a high straddler frame, which is travelled over the vines and to which a shaker and grape collecting apparatus is attached. The frame is supported on four wheels by extendable suspension means, which are operable to level the frame, irrespective of the direction and degree of slope of the ground. Most commonly, these suspension means comprise a set of hydraulic cylinders, which can be operated to lift or lower the one or other side of the frame.

Such a levelling system has been disclosed in U.S. Pat. No. 4,247,126, issued Jan. 27, 1981 in the name of Gerald L. Claxton wherein the rear and front cylinders on each side of the frame are hydraulically interconnected in order to form a master-slave system, which is operable to simultaneously extend or retract said cylinders in order to lift or lower the corresponding side of the frame. During normal harvesting operations, when no levelling action is taking place, the rear cylinders are hydraulically blocked as to maintain the rear wheels in a fixed vertical position relative to the frame, thereby forming a fixed rear axle of the vehicle.

In order to keep all wheels in firm ground engagement in spite of instant variations in the ground contour, the upper and lower chamber of the one front cylinder are permanently connected to the respective chambers of the other front cylinder, so that the retraction of one front cylinder causes the extension of the other by an equal amount. The front of the frame is still supported by the oil enclosed in the front cylinders, but the front wheels can move up and down, as if they were mounted on an articulated axle. This configuration makes the vehicle rest on its four wheels, which is particularly advantageous when all wheels are driven; otherwise the wheel which loses contact with the ground, may start to spin, so that the traction power of a portion of the drive line is lost.

Although this levelling system works well under most circumstances, it has been experienced that it is not capable of correcting the position of the frame under some rare, but very hazardous circumstances. This is the case when the high vehicle is travelling down a steep slope and one of the front wheels enters into a pit, whereby the vehicle starts to tilt sideways. One of the rear wheels even may loose contact with the ground. The operator, who wants to stabilize the vehicle, gives a command to raise the lowered side, but the system appears unable to stop the sideways movement of the vehicle and may even accelerate the same, so that it finally turns over.

SUMMARY OF THE INVENTION

It therefore is an object of the present invention to overcome the drawbacks of the above arrangement by providing means for improving the stability and maintaining the mean frame height of the utility vehicle during levelling operations.

According to one aspect of the present invention, a utility vehicle is provided, comprising a generally horizontal, rectangular frame with opposed sides and opposed ends, two first ground-engaging members at one end of the frame and two second ground-engaging members at the other end thereof, suspension means, supportingly mounted between the frame and the ground-engaging members and comprising two first and two second hydraulic actuator means for changing the position of respectively the first and second ground-engaging members with respect to the frame, hydraulic control means, linked to the hydraulic actuator means and operable to produce a hydraulic flow thereto or therefrom, the control means comprising a hydraulic articulation circuitry, interconnecting the two first actuator means as to make the two first actuator means act in opposition relative to each other, for maintaining the two first ground-engaging members in contact with the ground during instant variations in the ground contour, as seen in the transverse direction of the vehicle, and position command means, connected to the hydraulic control means and operable to steer the control means to change the position of the frame relative to the ground.

The utility vehicle is characterized in that the hydraulic control means further comprise an articulation control means, which is operable to block the articulation circuitry, so that actuation of one of the first actuator means does not directly result in actuation of the other of the first actuator means. Hence there are provided means for fastening the first ground-engaging members and improving the stability of the vehicle.

Most advantageously, the hydraulic actuator means comprise double-acting hydraulic cylinders and the position command means comprise levelling command means for sideways movement, and elevation command means for vertical movement of the vehicle frame. The actuation of the levelling command means breaks the articulation circuitry and effects the raising of one side of the frame and the lowering of the other side with a same amount.

The levelling and the elevation of the vehicle are commanded through a single lever or push button and, when two commands are given simultaneously, measures are taken to make the elevation command prevail over the levelling command.

The articulation control means may comprise a normally closed, solenoid operated control valve.

According to another aspect of the present invention a method is provided for levelling a utility vehicle, as described above, the method comprising the steps of, giving a levelling command to the position command means for simultaneous sideways movement of the ends of the frame relative to the ground, and steering the hydraulic control means to actuate the actuators on one side of the frame as to change the vertical position of this one side relative to the ground-engaging members.

The method is characterized by the further step of breaking the hydraulic articulation circuitry, as to impede the action of the one first actuator means on the other. In the steering step the actuators on the other side of the frame may be actuated in the opposite sense, so that the height of the centre of the frame is substantially maintained.

The foregoing and other objects, features and advantages of the invention will appear more fully hereinafter from a consideration of the detailed description which follows, in conjunction with the accompanying sheets of drawings wherein one principal embodiment of the invention is illustrated by way of example. It is to be expressly understood, however, that the drawings are for illustrative purposes and are not to be construed as defining the limits of the invention.

DESCRIPTION OF THE PREFERRED EMBODIMENT

Figure 1:
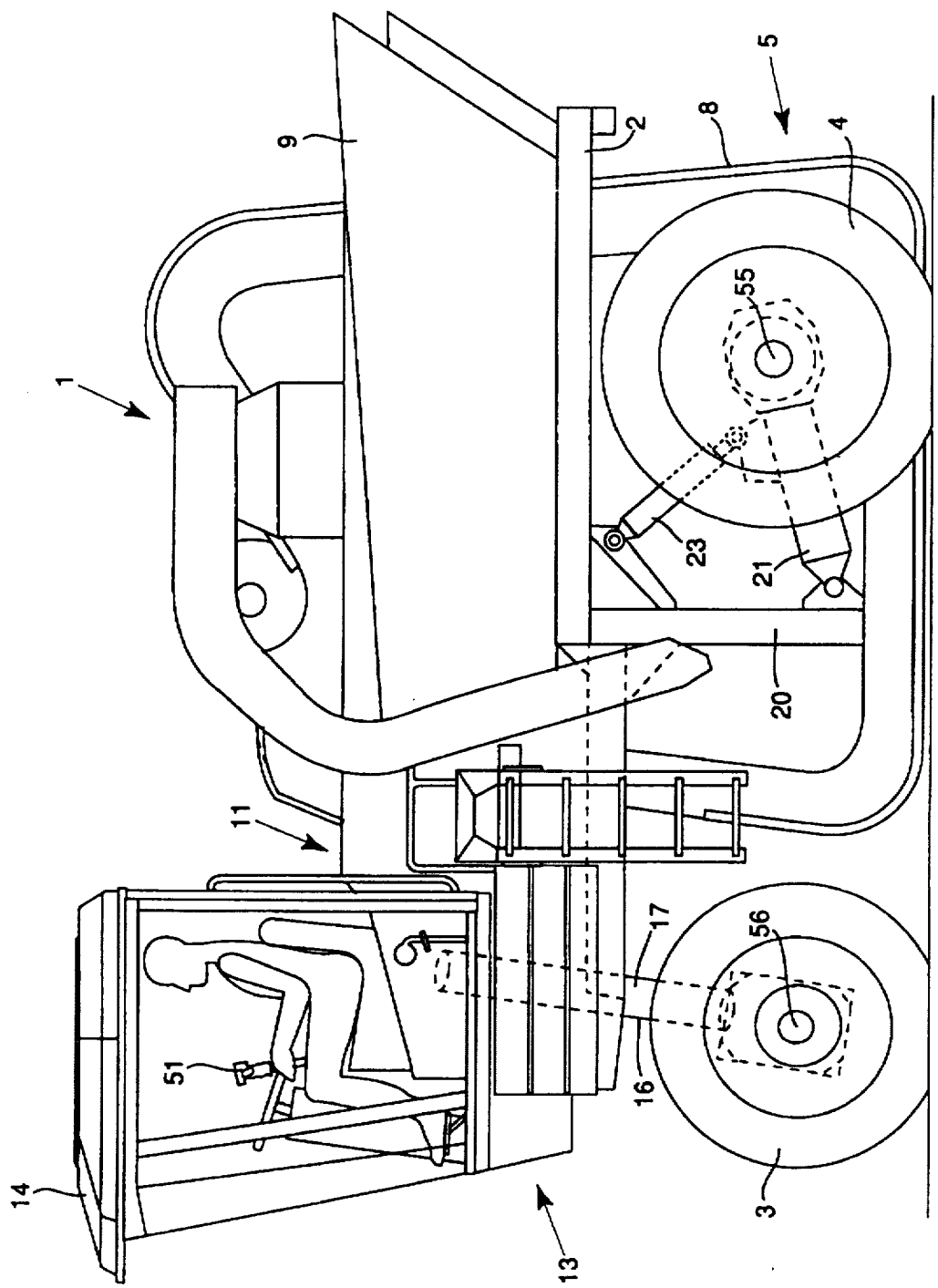
FIG. 1 is a schematic side view of a grape harvester, comprising a frame, sustained by four hydraulic cylinders, to which the wheels are attached.
Figure 2:
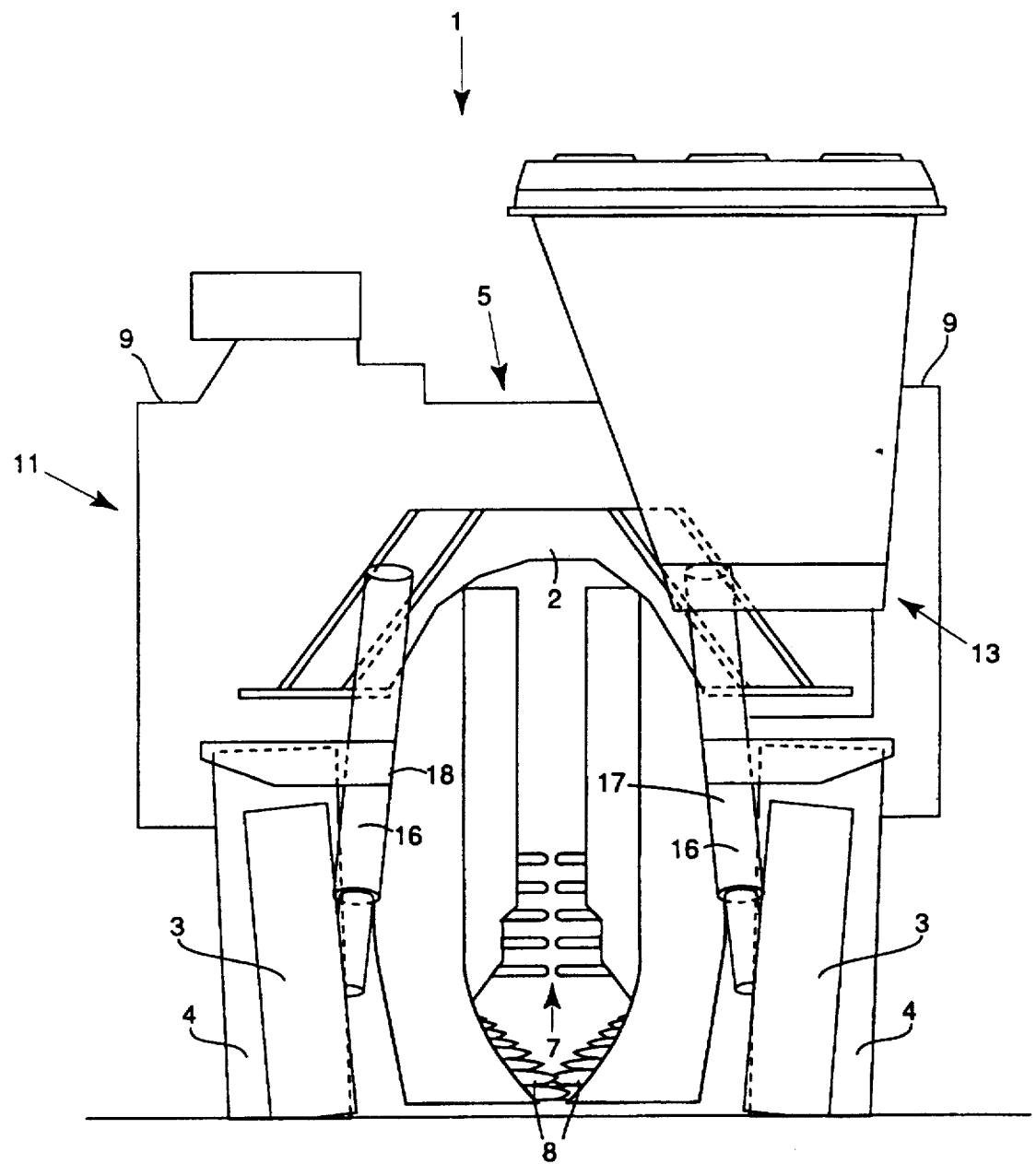
FIG. 2 is a schematic front view of the grape harvester of FIG. 1.

The utility vehicle shown in FIGS. 1 and 2 is a grape harvester, generally indicated by 1 and comprising a chassis or main frame 2, provided with front steerable wheels 3 and rear wheels 4. Both the front wheels 3 and the rear wheels 4 are driven for moving the frame 2 over the ground. The frame 2 is in the form of a gantry in order to be able to straddle a row of plants, such as grape-vines. In known manner, the frame 2 carries a harvesting assembly 5, comprising a shaker assembly 7 for detaching the grapes from the vines and two elevator conveyors 8 for collecting the detached grapes and conveying them to two storage tanks 9. The frame 2 further carries an engine 11, providing the rotational power necessary to drive the various active members of the harvesting assembly 5 and also providing motive power to the wheels 3, 4, since the vehicle 1 is of the self-propelled type.

The harvesting assembly 5 may be fixed in a permanent manner to the main frame 2 of the machine, or else, it may be made in the form of a removable assembly which is detachably affixed to the main frame 2, so as to be capable of being replaced by other equipment or accessories, such as spraying equipment, pruning equipment, equipment for tilling the ground, etc.

The driving and harvesting functions of the vehicle are controlled by the operator from an operator's platform 13, which is attached to the front portion of the frame 2 above the left steering wheel 3. To increase the comfort of the operator, an environmentally insulated cab 14 is provided which surrounds the operator's platform 13.

Support columns 16 extend downwardly from each side of the forepart of the main frame 2. The columns 16 comprise hydraulic actuator means in the form of double-acting hydraulic rams or cylinders 17, 18. The front wheels 3 are rotatably mounted to the rod ends of the hydraulic cylinders 17, 18 and can be turned left or right about the axis of the columns 16 by steering means (not shown). Extension of the left cylinder 17 or right cylinder 18, raises the respective front sides of the frame 2.

A pair of substantially vertical frame members 20 is welded on both sides of the vehicle 1 to the underside of the frame 2. A pair of rearwardly extending arms 21, to which the rear wheels 4 are rotatably mounted, is pivotably attached to the lower portion of the vertical frame members 20. The position of the arms 21 and hence of the wheels 4 is also controlled by hydraulic actuator means in the form of double-acting hydraulic cylinders 23, 24. The rod ends of these rear cylinders 23, 24 are pivotably mounted to the arms 21, while their head ends are equally pivotably mounted to the frame 2. Extension of the rear left cylinder 23 or rear right cylinder 24, raises the respective rear sides of the frame 2.

A control system for the levelling of the frame 2, according to the prior art, will now be described with reference to FIG. 3. The control system comprises hydraulic control means 26, which are linked to the double-acting hydraulic cylinders 17, 18, 23, 24 for extension and retraction thereof.

The left front cylinder 17 is connected to the right cylinder 18 by a hydraulic articulation circuit 27, constituted by a first articulation line 28, interconnecting the head end chambers of said cylinders 17, 18, and a second articulation line 29, interconnecting the rod end chambers of the same. The weight of the front end of the main frame 2 is born by the oil enclosed in the head end chambers of the front cylinders 17, 18 and the first articulation line 28. When external action on the rod of the left front cylinder 17 makes the same extend or retract, oil will freely flow through the articulation lines 28, 29 between the front cylinders 17, 18, so that the right front cylinder 18 is retracted or extended in the opposite sense. External action on the right front cylinder 18 has an analogous effect on the left front cylinder 17. As these cylinders 17, 18 have equal dimensions, the wheels 3 at the ends thereof are moved with an equal amount, as if they were mounted on an axle 56 which is articulately connected to the front of the frame 2.

The head end chambers of the left and right front cylinder 17, 18 are also connected by a left and right elevation line 30, 31 to the rod end chambers of the respective left and right rear cylinders 23, 24, so that a movement of a piston of one of the rear cylinders 23 or 24 engenders a similar movement of the piston of the corresponding front cylinder 17 or 18 in a master-slave configuration. The dimensions of the rods and the cylinder bodies have been calculated as to make the front and the rear portion on the same side of the frame 2 raise or lower that side with an equal amount, so that the complete side is moved up or down in a parallel way.

The head end chamber of the rear left cylinder 23 is linked by a left control line 34 to a left, solenoid operated control valve 38 with four ports and three positions. Another port of the left control valve 38 is connected through the second articulation line 29 to the rod end of the front left cylinder 17. Similarly, the head end of the rear right cylinder 24 is linked by a right control line 35 to a right, solenoid operated control valve 39 with four ports and three positions. Another port of the right control valve 39 is connected through the same articulation line 29 to the rod end of the front right cylinder 18. When the control valves 38, 39 are in their rest positions, the ports are closed, so that the pistons of the rear cylinders 23, 24 are blocked by the oil in the head ends thereof and any upward or downward movement of the rear wheels 4 relative to the frame 2 is impeded, as if they were mounted onto a fixed rear axle 55.

Hence, when the vehicle 1 is travelling over uneven ground, the vertical position of the frame 2 is defined by the rear wheels 4, while the front wheels 3 are permitted to move up or down in order to remain in constant engagement with the ground, even when pits or bumps are encountered. As ground contact is secured for all wheels 3, 4, none of them can start to spin freely and no consequent loss of traction power can occur.

The hydraulic control means 26 further comprise a gear pump 42, which is driven by the engine 11 and takes oil from an oil tank 41 for delivery to an oil flow divider 43, which in turn delivers the pressurized oil to the left and right control valves 38, 39. The oil pressure is controlled in a conventional manner by a pressure relief valve 45, installed between the pump 42 and a return line 46, which delivers the oil back to the tank 41 through an oil filter 47.

The operator steers the control valves 38, 39 by means of electrical command means 49, comprising a battery 50, a manually controlled multi-functional switch 51 with four contacts RD, RU, LD, LU and electrical circuitry connected to the solenoids of said valves 38, 39. In a conventional manner, the switch 51 is not directly linked to the valves 38, 39, but commands a set of relays 53, which prevent the burning of the contacts RD, RU, LD, LU by the actuating current of the valve solenoids.

When the operator closes the contact LU of the switch 51, the left control valve 38 is shifted to the right and oil is supplied to the head end of the rear left cylinder 23, which extends and delivers oil from its rod end through the left elevation line 30 and the first articulation line 28 to the head ends of the front left cylinders 17, 18, which are allowed to extend as their piston ends are connected through the articulation line 29 and the control valve 38 to the return line 46. The rear left side of the frame 2 is lifted up by the rear left cylinder 23 and the rigidity of the frame 2 entrains the front left side thereof, so that the front left cylinder 17 is extended simultaneously and no oil flows to or from the front right cylinder 18. As the conditions of the rear right and front right cylinders 24, 18 remain unchanged, the height of the right side of the frame 2 is maintained and only the left side of the frame 2 is lifted up.

In an analogous way, only the right side of the frame 2 is lifted up by the rear right and the front right cylinders 24, 18, when the contact RU of the switch 51 is closed by the operator.

Closing the contact LD of the switch 51 makes the left control valve 38 shift to the left, thereby connecting the left control line 34 and the head end of the rear left cylinder 23 to the return line 46, so that this cylinder 23 starts to retract under the weight of the vehicle 1. Simultaneously, an oil flow is provided through the second articulation line 29 to the rod ends of the front cylinders 17, 18. As a portion of the oil in the heads of the front cylinders 17, 18 flows via the articulation line 27 and the left elevation line 30 to the rod end of the rear left cylinder 23, the front cylinders 17, 18 are enabled to retract equally, but the rear left side of the frame 2 is lowered and the rigidity of the frame 2 entrains its front left side, so that the front left cylinder 17 retracts by an equal amount and no oil flows from or to the front right cylinder 18. As the conditions of the rear right and front right cylinders 24, 18 remain unchanged, the height of the right side of the frame 2 is maintained and only the left side of the frame 2 is lowered.

In an analogous way, only the right side of the frame 2 is lowered on the rear right and the front right cylinders 24, 18, when the contact RD of the switch 51 is closed by the operator.

It is thus clear that when one side of the frame 2 is raised or lowered to level the vehicle 1 in accordance with a change in transverse slope, the centre of the frame 2 is equally raised or lowered, be it with half the distance of the moved side. Consequently, the position of the harvesting assembly 5 with respect to the plants is changed, which may result is a less efficient action of the shaker assembly 7 and the elevator conveyors 8.

Figure 4:
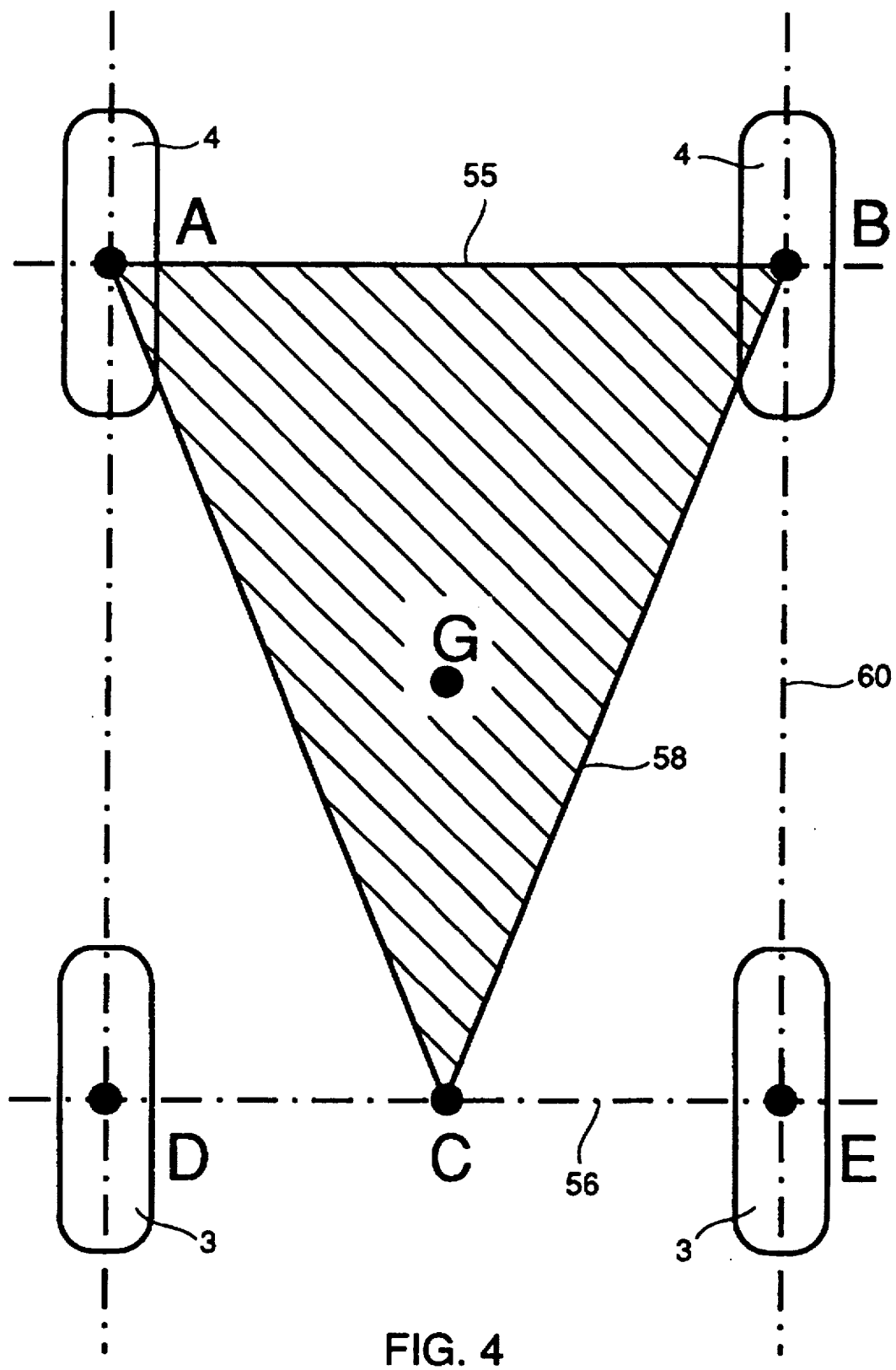
FIG. 4 is a diagram of the frame and the wheels of the grape harvester.

The normal operation of the hydraulic control means 26, as depicted above, can only take place when the vehicle 1 is stable. As illustrated in FIG. 4, the condition for static stability of the vehicle 1 is that the vertical projection of its centre of gravity G falls within the polygon of its rest points. At the rear end of the vehicle 1 the rest points are defined by the undersides A and B of the rear wheels 4, which are held in position relative to the main frame 2 by the rear hydraulic cylinders 23, 24. The virtual axle 55, which passes through the centres of the rear wheels 4, is secured to the frame 2. At the front end of the vehicle 1, the undersides D and E of the front wheels 3 do not constitute a fixed rest point, as they are permitted to move relative to the frame 2, but their movements are mutually linked by the articulation circuitry 27, so that the virtual axle 56, which passes through the centres of the front wheels, oscillates as if it was attached to an articulation point C which is fixed to the front end of the vehicle 1. Hence, the stability polygon 58 is constituted by the triangle ABC.

When the frame 2 is levelled, the centre of gravity G is at the centre of a rectangle ABDE, and the vertical projection thereof definitely falls within the triangle ABC. When the frame 2 is tilted sideways, as when the vehicle 1 engages a transverse slope, which e.g. descends to the left, the centre of gravity G leaves it central position and shift sideways towards the line BC. The shifting effect is increased because the vehicle 1 has a relatively narrow frame and a high centre of gravity G, as most straddling vehicles. From the moment that the point G shifts over the line BC, the rear wheel 4 at the point A will loose contact with the ground and the frame 2 will start to tip over.

When the vehicle 1 is running down a steep hill, with its rear end at a higher level than the front end, the centre of gravity G is shifted in a forward direction towards the point C. In this situation, the frame 2 becomes even more vulnerable to tipping over, as the safety area between the point G and the borders of the stability polygon 58 has been reduced substantially. It suffices that one of the wheels 3, 4 suddenly enters a pit or is forced over a considerable bump, to make the centre of gravity G leave the triangle ABC and to make one of the rear wheels 4 loose contact with the ground.

The operator who experiences such uncontrolled movement, will try to restore the stability of the vehicle 1 by levelling it with the hydraulic control means 26. For example, when the vehicle 1 tilts to the left, the operator will want to raise its left side by closing the contact LU. The left control valve 38 is energized and the rear left cylinder 23 extends as described above, but the oil from the rod end of this cylinder 23 now has a tendency to flow to the head end of the front right cylinder 18, rather than to the head end of the front left cylinder 17, because the latter is pressurized by the leftward movement of the frame 2 and the larger portion of the weight near the left side. Consequently, the front right cylinder 18 is extended momentarily, so that the leftward movement of the vehicle 1 is even amplified. At the beginning, the centre of gravity G lied outside the stability polygon 58 and now it is moving even further away therefrom, so that the gravity forces are unable to restore the equilibrium of the frame 2. The oil can still freely flow from the head end of the front left cylinder 17 to the head end of the right front cylinder 18, so that the leftward movement of the frame 2 is not stopped thereby and the vehicle 1 finally tips over.

The hydraulic cylinders 17, 18, 23, 24 and the vehicle 1 behave in an analogous manner, when the vehicle tilts so far to the right, that the centre of gravity leaves the triangle ABC, and the operator closes the contact RU in order to counter this movement.

Figure 3:
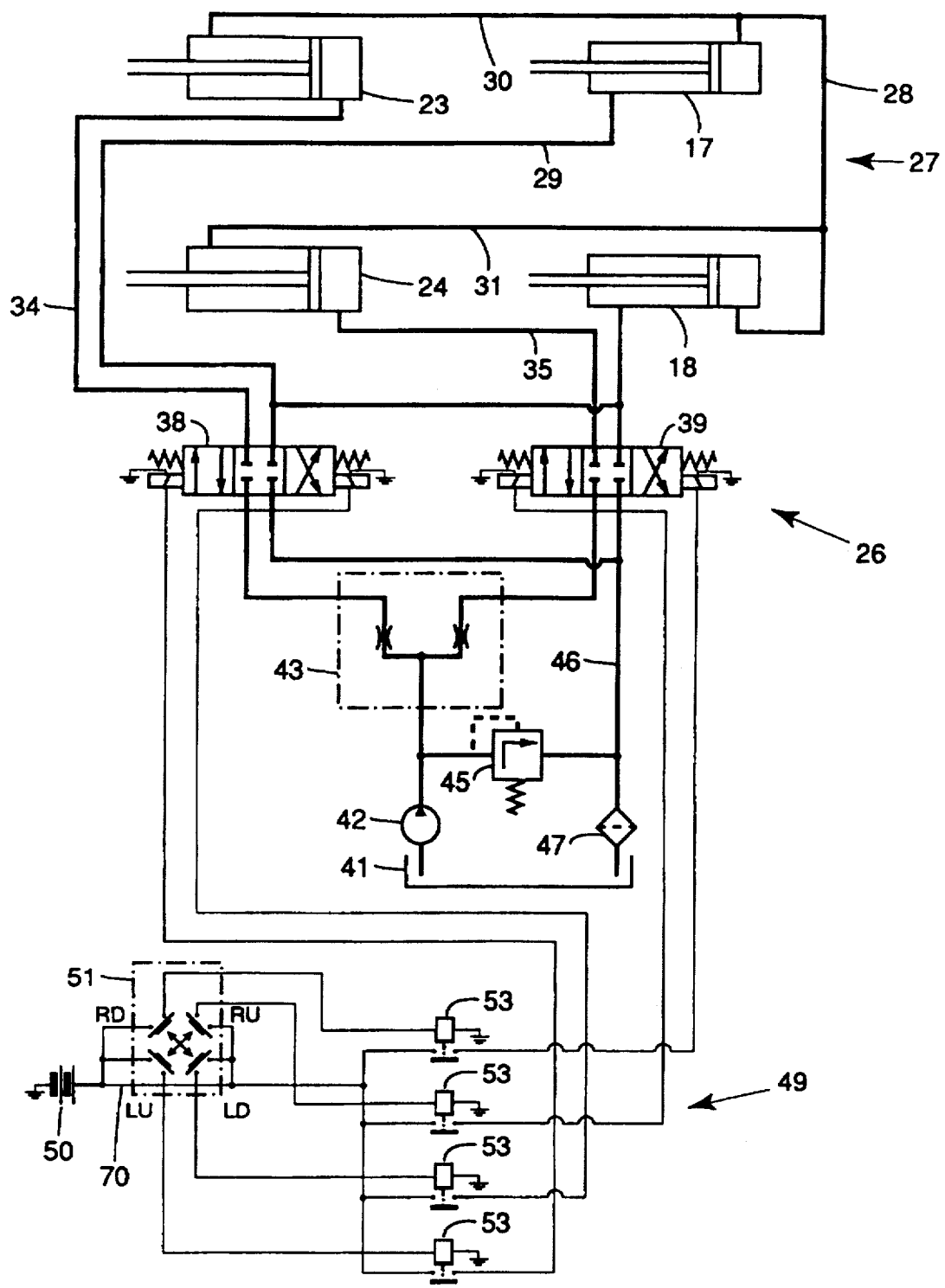
FIG. 3 is a hydraulic and electrical scheme of a control system for the hydraulic cylinders, according to the prior art.
Figure 5:
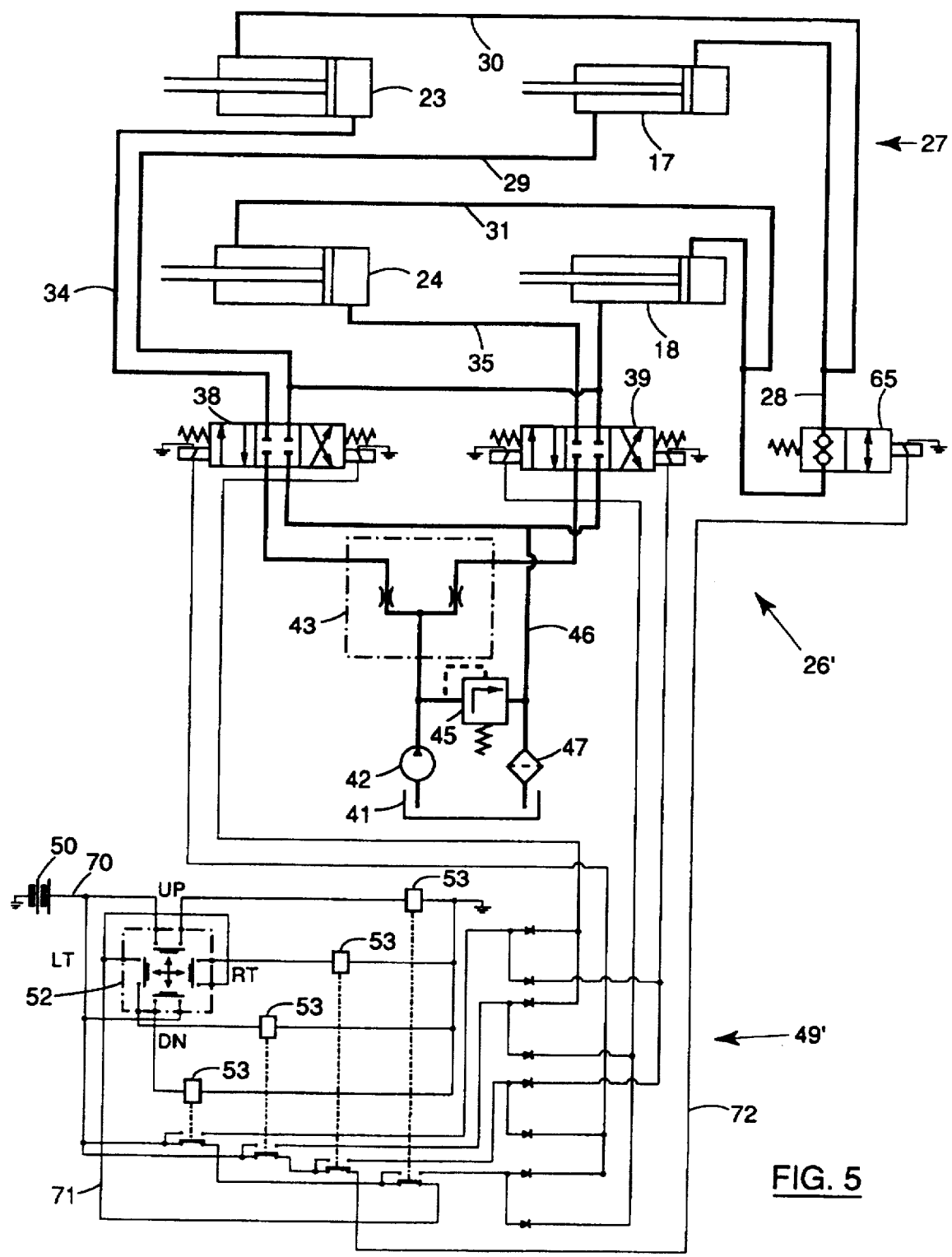
FIG. 5 is a hydraulic and electrical scheme of a control system for the hydraulic cylinders, according to the present invention.

According to the present invention, this type of accidents can be prevented with the improved hydraulic control means 26' and electrical command means 49', which are depicted in FIG. 5 The hydraulic control means 26' comprise all the elements of the prior art configuration of FIG. 3, but additionally, the first articulation line 28 has been provided with a solenoid operated control valve 65 with two ports and two positions. At rest, this articulation valve 65 blocks the oil flow between the head ends of the front cylinders 17, 18, as to impede any effect of the left cylinders 17, 23 on the right cylinders 18, 24 and vice versa. When the articulation valve 65 is actuated, the communication between the front cylinders 17, 18 is restored, so that the one front wheel 3 moves up or down in opposition to the other front wheel 3.

The improved command means 49' comprise a manually controlled multi-functional switch 52 with four contacts UP, DN, LT, RT for operation of four relays 53. The contacts UP and DN are linked to a primary plus line 70, which is directly linked to the battery 50. The contacts LT and RT are energized by a secondary plus line 71, which is connected to the primary plus line 70 via the relays 53 of the contacts UP and DN. Whenever one of the latter contacts is closed, the secondary line 71 is cut from the battery 50 by one of the relays 53 and the contacts LT and RT become inoperative. Hence, when the operator closes two neighbouring contacts simultaneously, e.g. by giving a push between two neighbouring contacts of the switch 52, only the contacts UP and DN will remain energized.

The command means 49' further comprise an electrical line 72 to the solenoid of the articulation valve 65. This line 72 is connected to the primary plus line 70 via the relays 53 of the contacts LT and RT. As long as the switch 52 is not operated, the solenoid of the articulation valve 65 is energized as to permit the articulated movement of the front wheels 3. This condition is not changed when one of the contacts UP or DN is closed, but when the operator closes one of the contacts LT or RT, said solenoid will be deenergized and the first articulation line 28 will be broken by the articulation valve 65.

Any command given through the switch 52 results in the actuation of both the left control valve 38 and the right control valve 39.

The closing of the contact LT makes the left control valve 38 shift to the left and the right control valve 39 shift to the right, whilst the first articulation line 28 is broken by the articulation valve 65, as explained above. Pressurized oil is supplied to the rod end of the front left cylinder 17 and the head end of the rear right cylinder 24, while the head end of the rear left cylinder 23 and the rod end of the front left cylinder 18 are connected to the return line 46. The rear right cylinder 24 extends and provides an oil flow from its rod end to the right elevation line 31. As the first articulation line 28 is broken, the front right cylinder 18 has to extend too and the right side of the frame 2 is lifted up in a parallel way.

Meanwhile, oil flows from the head end of the rear left cylinder 23 to the return line 46 and from the head end of the front left cylinder 17 via the left elevation line 30 to the rod end of the rear left cylinder 23. Both left cylinders 17, 23 retract simultaneously and the left side of the frame 2 is lowered in a parallel way. As a result, the frame 2 is moved slightly sideways to the left, but the height of the centre of the frame 2 is substantially maintained.

In a completely analogous manner, the closing of the contact RT causes the extension of the left cylinders 17, 23, and the retraction of the right cylinders 18, 24, so that the left side of the frame 2 is lifted up and the right side is lowered. In consequence, the frame 2 is moved slightly to the right, but the height of its centre is equally substantially maintained.

When the contact UP is closed both control valves 38, 39 are shifted to right, so that oil is supplied to the head ends of both rear cylinders 23, 24. The oil from the rod ends thereof flows via the elevation lines 30, 31 to the head ends of the front cylinders 17, 18, while their rod ends are connected via the second articulation line 29 and the control valves 38, 39 to the return line 46. As a result, all four cylinders 17, 18, 23, 24 extend and both sides of the frame 2 are raised simultaneously.

When the contact DN is closed both control valves 38, 39 are shifted to the left, so that oil is supplied to the rod ends of both front cylinders 17, 18. The oil from the head ends thereof flows via the elevation lines 30, 31 to the rod ends of the rear cylinders 23, 24, while their head ends are connected via the left and right control lines 34, 35 and the control valves 38, 39 to the return line 46. As a result, all four cylinders 17, 18, 23, 24 retract and both sides of the frame 2 are lowered simultaneously.

When no levelling or elevation command is given to the command means 49', the solenoid of the articulation valve 65 is energized and the first articulation line 28 is opened, as to permit the oscillation of the front wheels 3 relative to the front of the frame 2. During travel, the vehicle 1 behaves exactly as with the hydraulic control means 26 according to the prior art. The stability of the vehicle 1 is equally determined by the position of the centre of gravity G relative to the stability triangle ABC.

When the vehicle 1 is running down a steep hill and one of the front wheels 3 suddenly falls in a pit or rolls over a considerable bump, the frame 2 will start to tip over as explained above. The operator, who wishes to counter this motion, will close the LT or RT contact of the switch 52, as required for levelling the frame 2. As a result the articulation circuitry 27 of the front wheels 3 is broken and each corner of the frame 2 is solidly supported by the corresponding cylinder 17, 18, 23, 24. The stability triangle polygon 55 is replaced by a larger stability polygon 60, defined by the rectangle ABDE. The centre of gravity, which had left the triangle ABC, still lies within the new stability polygon 60, so that the stability of the vehicle 1 is restored.

The motion of the frame 2 is stopped and reversed by the actuation of the control valves 38, 39 and the centre of gravity G returns to its original position along the middle line of the triangle ABC.

When the vehicle 1 is levelled again, the operator releases the switch 52 and the control valves 38, 39 shift back to their rest positions, while the articulation valve 65 reopens the articulation line 28, so that the frame 2 is supported by the triangle ABC again. As the vertical projection of the centre of gravity G has returned within the stability polygon 58, the stability of the vehicle 1 has been restored.

In theory, when the frame 2 and the wheels 3, 4 are regarded as perfectly rigid bodies, the rectangle ABDE builds a hyperstatic configuration, whereof only three points can simultaneously support the vehicle 1 on rough ground. Hence, one of the wheels 3, 4 is bound to loose contact with the ground. In reality however, the tires are able to adapt to minor changes in the ground contour, so that, during the levelling operation, ground engagement is maintained at the four angles of the rectangle ABDE.

Other embodiments of the present invention can be thought of without departing from the original idea of the invention. For example, a pair or all of the wheels 3, 4 can be replaced with other ground-engaging members, such as tracks or sledges. The hydraulic actuator means may comprise hydraulic motors for extending or retracting mechanical spindles in order to level the vehicle 1. The command means 49' can also comprise an automatic levelling system, which senses the transverse inclination of the frame 2 and actuates the control valves 38, 39 in response thereto. The inclination can be measured by means of a mechanical pendulum or an electronic inclinometer. The hydraulic control means 26' may equally comprise a by-pass valve, which directs the oil from the oil pump 42 immediately to the return line 46. When pressurized oil is needed at the control valves 38, 39, the by-pass valve is closed and oil pressure is built up until the relief valve 45 opens. Although this invention has been described in use on a grape harvester, it can also advantageously be installed on other straddling vehicles such as vineyard tractors, vineyard spraying machines, coffee harvesters, etc.

It will be appreciated that, according to the invention, means are provided for improving the stability of a utility vehicle 1, which is travelled along and across slopes. In addition to levelling means for raising or lowering a side of its frame 2, means 27 are provided for making the front wheels 3 move in opposition to each other during normal travelling operation and means 65 for blocking the same, when a levelling command is given by the operator. In the latter case, the stability polygon of the vehicle 1 is formed by the rectangle ABDE, which offers much better boundary conditions for stability than the original triangle ABC.

While the preferred structure in which the principles of the present invention have been incorporated is shown and described above, it is to be understood that the invention is not to be limited to the particular details, as shown and described above, but that, in fact, widely different means may be employed in the practice of the broader aspects of the invention.

Having thus described the invention, what is claimed is:
1. A utility vehicle (1) comprising:
   a generally horizontal, rectangular frame (2) with opposed sides and opposed ends;
   two first ground-engaging members (3) at one end of said frame (2) and two second ground-engaging members (4) at the other end thereof;
   suspension means, supportingly mounted between said frame (2) and said ground-engaging members (3, 4) and comprising two first hydraulic actuator means (17, 18) and two second hydraulic actuator means (23, 24) for changing the position of respectively said first ground-engaging members (3) and second ground-engaging members (4) with respect to said frame (2);
   hydraulic control means (26'), linked to said hydraulic actuator means (17, 18, 23, 24) and operable to produce a hydraulic flow thereto or therefrom; said control means (26') comprising a hydraulic articulation circuitry (27), interconnecting said two first actuator means (17, 18) as to make them act in opposition relative to each other, for maintaining the two first ground-engaging members (3) in contact with the ground during instant variations in the ground contour as seen in the transverse direction of the vehicle; and
   position command means (49'), connected to said hydraulic control means (26') and operable to steer said control means (26') to change the position of said frame (2) relative to the ground;
   characterized in that:
   said hydraulic control means (26') further comprise an articulation control means (65), which is operable to block said articulation circuitry (27), so that actuation of one of said first actuator means (17, 18) does not directly result in actuation of the other of said first actuator means (18, 17), and further characterized
   in that said position command means (49') comprise levelling command means (52) for simultaneous sideways movement of the ends of the frame (2) relative to the ground; the arrangement being such that actuation of said levelling command means (52) induces the articulation control means (65) to break the articulation circuitry (27).

2. A utility vehicle (1) according to claim 1, characterized in that actuation of the levelling command means (52) effects the raising of one side of the frame (2) and the lowering of the other side of the frame (2) with a same amount, so that the height of the centre of said frame (2) is substantially maintained.

3. A utility vehicle (1) according to claim 1, characterized in that said levelling command means (52) further comprise elevation command means for unitary vertical movement of the sides of the frame (2).

4. A utility vehicle (1) according to claim 3, characterized in that actuation of said elevation command means induces the articulation control means (65) to open the articulation circuitry (27).

5. A utility vehicle (1) according to claim 3, characterized in that:
   the elevation command means and the levelling command means jointly comprise a multi-functional switch; and
   the position command means comprise means (53) for inhibiting actuation of the levelling command means during actuation of the elevation command means and/or vice versa.

* * * * *